UNITED STATES PATENT OFFICE.

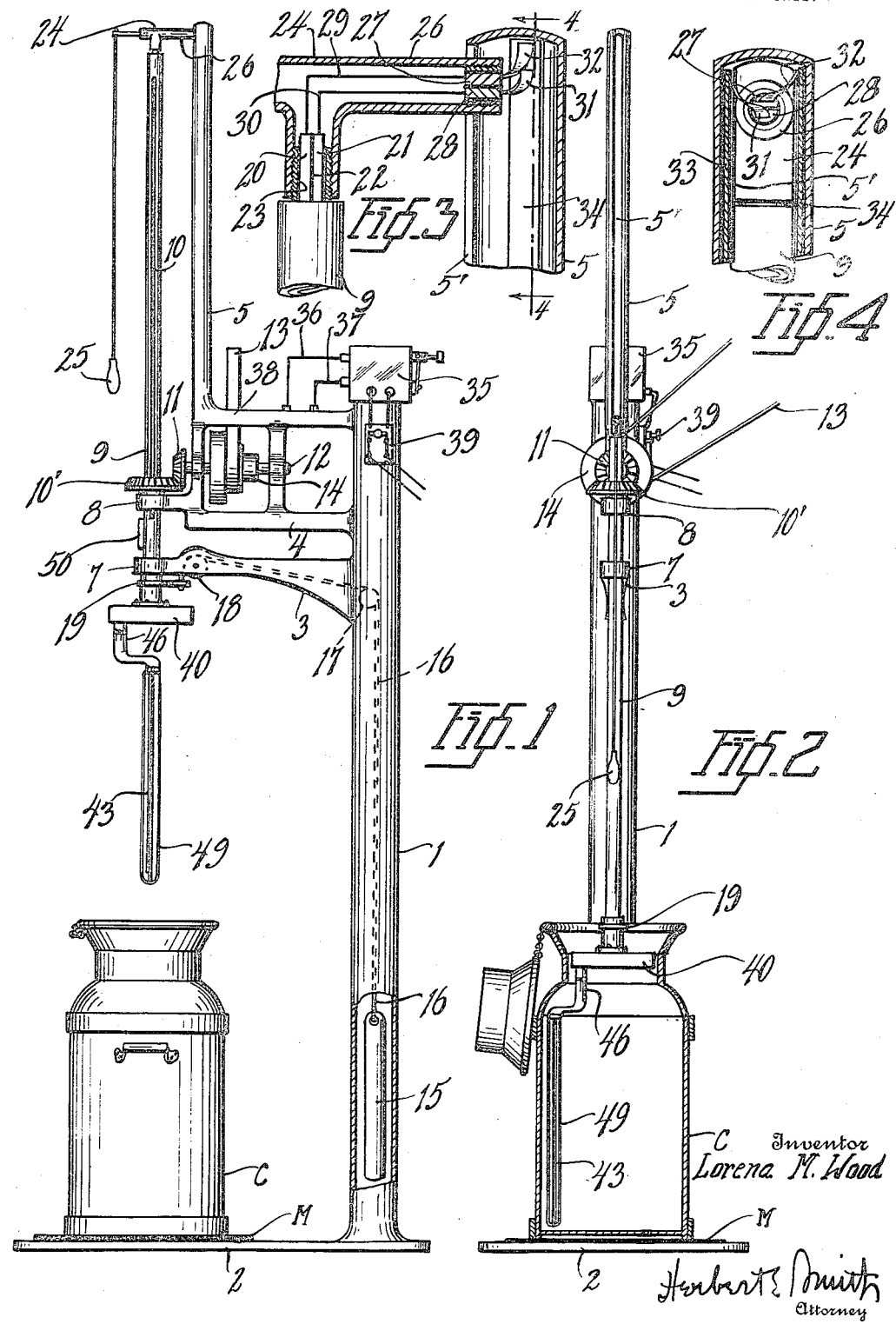

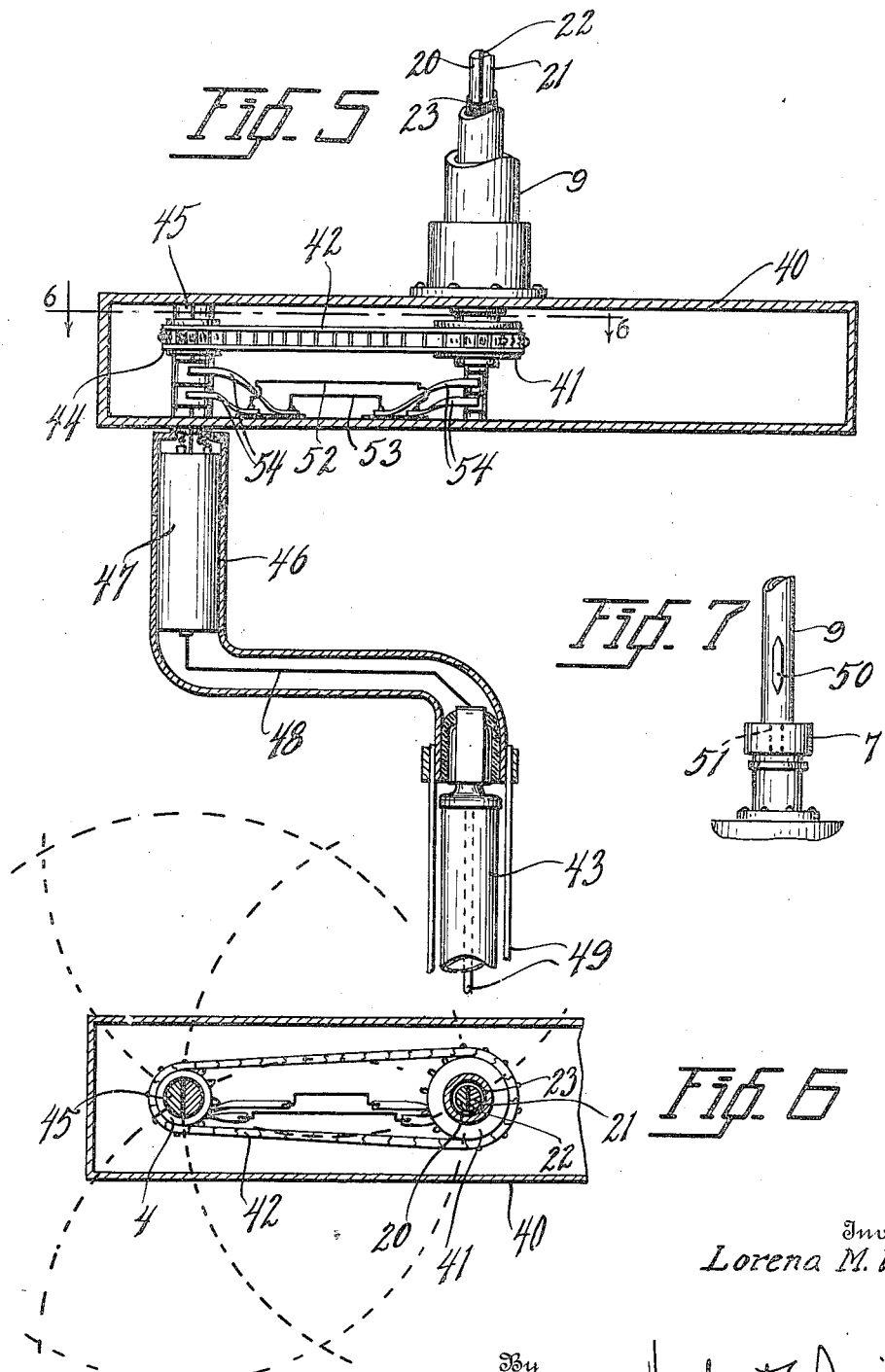

LORENA M. WOOD, OF SPOKANE, WASHINGTON, ASSIGNOR OF ONE-HALF TO JOSEPH R. GUMM, OF KELSO, WASHINGTON.

APPARATUS FOR STERILIZING LIQUIDS.

1,297,525.  
Specification of Letters Patent. Patented Mar. 18, 1919.

Application filed December 19, 1917. Serial No. 207,969.

*To all whom it may concern:*

Be it known that I, LORENA M. WOOD, a citizen of the United States, residing at Spokane, in the county of Spokane and State of Washington, have invented certain new and useful Improvements in Apparatus for Sterilizing Liquids, of which the following is a specification.

The present invention relates to an improved apparatus for sterilizing liquids, and particularly for purifying milk by destroying the bacteria or germs in the milk by the emission of ultraviolet rays from an electrode or electric lamp.

The primary object of the invention is the provision of a simple, compact, and portable device or apparatus for use in the process of sterilizing milk by the action of the ultraviolet rays in order that all particles of the milk may be reached and sterilized while the milk remains in the container or can usually employed as a shipping receptacle.

The invention consists in certain novel combinations and arrangements of parts whereby the electric lamp or electrode is actuated while submerged in the milk in the can so that the rays emitted from the lamp will reach and act upon all particles of the milk.

In the accompanying drawings one complete example of the physical embodiment of the invention is illustrated, constructed and arranged according to the best mode so far devised for the practical application of the principles of the invention.

Figure 1 is a side elevation of a complete machine or apparatus involving the invention, showing the lamp or electrode in inoperative position and withdrawn from the milk can.

Fig. 2 is a front view of the apparatus, showing the milk can in section and the lamp in operative position within the can.

Fig. 3 is an enlarged sectional detail showing the spindle supporting guide post and connections from the spindle.

Fig. 4 is a sectional view at the top of the post, on line 4—4 of Fig. 3 showing particularly the sliding contact brushes and copper plates inside the post for providing continuous electric current to the lamp.

Fig. 5 is a still further enlarged view showing the revoluble housing in section, the actuating crank arm for the lamp and a portion of the lamp.

Fig. 6 is a sectional plan view on line 6—6 of Fig. 5.

Fig. 7 is a detail view showing the guide lug on the spindle which insures proper withdrawal and insertion of the lamp to prevent accidental contact with the milk can.

In the preferred embodiment of the invention as illustrated in the drawings, a hollow metallic standard 1 is depicted and provided with a comparatively large base plate 2 upon which the milk can or container C is placed, and an insulating mat M is preferably inserted beneath the can to separate the can electrically, from the base plate.

The apparatus is portable, in that it is of size and shape which render its removal from place to place with facility, and the standard is designed for supporting the lamp actuating apparatus or mechanism through the instrumentality of the supporting bracket 3 and the frame 4, both integral with the standard and located near the top thereof, with a hollow slotted post 5 rising from the frame, and offset from the standard so that the lamp revolving device supported thereby is centered above the base plate upon which the can of milk is placed for sterilizing the milk contained therein. The post, as stated is hollow throughout its height, closed at its top, and at the front side is formed with a slot 5' extending its full length, to act as a guide slot for the lamp revolving device.

The bracket 3 and frame 4 have axially alined bearings 7 and 8 in which a hollow spindle 9, parallel with the hollow post and hollow standard, is slidable vertically, and also revoluble, a long slot 10 being provided in the face of the spindle for a key, not shown, in the bevel gear 10' supported in the bearing 8 and revolved by the pinion 11 on the horizontal shaft 12 journaled in the frame 4. The driving shaft 12 may be revolved by the utilization of the driving belt 13 on any one of the pulleys 14 as usual. It will thus be apparent that the hollow spindle will be revolved by the bevel gear and bevel pinion, in its bearing, regardless of the position of the spindle as to altitude, and the spindle may be counter-balanced, together with the operative parts of the device, through the instrumentality of a weight 15 in the hollow standard and chain 16 passing over the guide wheels 17 and 18 in the bracket 3 to the collar 19 which is connected to the spindle in such manner as not to interfere with its revolution, but yet to exert a pull on the spindle when desired to lift it from operative position.

Incased within the hollow spindle is a conductor rod made up of two bars 20 and 21, crescent shape in cross section and provided with an insulating plate 22 between them so that they form a cylindrical conductor bar, stationary as to relation to the spindle and insulated therefrom by an insulating tube 23. At its upper end the conductor rod has a T-shaped cross-head 24 and pull cord and handle 25, and the branch 26 of the T extends into the slot 5' of the hollow post 5, through which it is adapted to slide and guide the spindle. The T 24 is hollow and one end is closed by the insulated plugs 27, 28 for the wires 29, 30 from the conductor rod, and these plugs have brushes 31, 32, that slide in frictional contact with the copper contact plates 33 and 34, diametrically disposed within the post 5 and extending from top to bottom thereof, and these plates are in circuit with the generator 35 on the frame 4, through the wires 36 and 37, and arm 38 of the frame, the current being controlled by an electric switch 39, as usual.

At the lower end of the spindle is attached a metallic box or housing 40, and the conductor rod extends through the housing and has secured thereon a non-rotatable sprocket wheel 41 around which the chain 42 is caught and winds. The housing and spindle are revolved through the bevel gear and pinion, about the conductor rod as a stationary axis, in order to impart rotary movement to the lamp 43 in its relation to the housing, and also to bodily revolve the housing which carries the lamp. Thus the chain 42 is connected with a second sprocket wheel 44 on the shaft 45, which is journaled in the housing some distance from the spindle, and provided with a hollow crank arm 46, in which the terminal shell 47 is located, and at the end of which arm the lamp or electrode is carried as indicated, the wire 48 carrying current of electricity from the terminal shell to the lamp, and a guard 49, of wire incases the lamp to prevent breakage. On the spindle, a feather 50 is provided which must be alined to pass through a groove 51 shown in dotted lines in the bearing 7 in Fig. 7 so that the lamp will be properly positioned when being inserted or withdrawn from the milk receptacle to avoid danger of breaking the lamp. Preferably the electric lamp is of the type involving a glass tube which is filled with gas that will readily receive and transmit electric currents from the terminal in the hollow crank arm supporting the lamp. In Fig. 5 it will be seen that the conductor rod in the spindle is connected to the lamp revolving shaft 45 by wires or conductors 52 and 53 provided with brushes 54 in contact with the conductor rod and shaft.

The utility of the counterbalancing weight will be apparent in moving the lamp to operative position and moving it to inoperative position, and it will readily be seen that the lamp may be lowered or submerged in the milk in the can by pulling down on the pullcord, and the weight will counterbalance the spindle, lamp and connections. The lamp is introduced into the can and withdrawn therefrom only when it is located centrally of the spindle, i. e. when it is in position of alinement therewith as indicated in Fig. 1, and to be thus introduced or withdrawn the key 50 must pass through the guide groove 51 as described.

With the lamp located in proper position, the belt 13 is turned to revolve the spindle and also revolve the lamp, or it may be that the belt is driving the mechanism before the lamp is lowered into the can. In either event, after the lamp is lowered into the milk the electric switch is turned to direct the current to the lamp as described, and the rays are emitted therefrom to act on the milk. By the action of the revolving housing, which carries the lamp bodily around in the circle, the sprocket chain in the housing is also made to revolve the shaft 45 and the crank arm supporting the lamp is revolved with relation to the housing causing the lamp to execute a series of loops in a circle and rotate in the circle between the center and periphery of the milk can. In this manner the milk is stirred or agitated and the lamp is brought into close contact with all the particles of milk in the can to thoroughly and completely sterilize the milk.

The electricity from the emitted ultraviolet rays is transmitted through the milk to the can and can be drawn off from contact points (not shown) on the can as desired.

What is claimed herein is:—

1. A sterilizing apparatus comprising a supporting member and an ultraviolet ray lamp, a rotary member supporting the lamp, and means on the rotary member for revolving the lamp with relation to said member.

2. A sterilizing apparatus comprising a support, a rotary member operatively supported in the support and means for actuating said member, and an ultraviolet ray lamp carried by the rotary member, and means for revolving the lamp with relation to the rotary member.

3. The combination in a sterilizing apparatus, with a supporting standard, of a rotary spindle and operative means therefor and a supporting member rotatable with the spindle, a revoluble lamp carried by the rotary member and means for revolving the lamp with relation to the member.

4. The combination in an apparatus as described, with a supporting standard, of a rotary spindle and means for raising and lowering the spindle, means for rotating the spindle, a lamp supporting device carried by the spindle and means for revolving said device with relation to the spindle.

5. The combination in a sterilizing apparatus with an ultraviolet ray lamp having supporting means, mechanism for rotating said means to bodily rotate the lamp and means for revolving the lamp with relation to said supporting means.

6. The combination in a sterilizing apparatus including an ultraviolet lamp and means for actuating the lamp whereby it is caused to execute a series of loops in the pathway of a circle.

7. The combination with a hollow standard having supporting members, of a spindle reciprocable in said members and a counterbalancing weight in the standard connected with the spindle, means for rotating the spindle, and an ultraviolet lamp carried in operative relationship with the spindle.

8. The combination with a hollow standard having supporting members and a hollow, slotted guide post, of a spindle reciprocable in the members and guided in said post, a counterbalancing weight in the standard connected with the spindle, means for rotating the spindle, a supporting member rotatable with the spindle, a lamp carried by said member and means for revolving the lamp with relation to the member.

9. The combination in a sterilizing apparatus with a rotatable spindle, means for supporting the spindle and for moving it into operative or inoperative position, an ultra violet lamp carried by the spindle, a non-rotatable conductor rod incased within the spindle and movable therewith, and electrical connections from said rod to the lamp and to a source of supply.

10. The combination in a sterilizing apparatus with a slidable spindle carrying an ultraviolet lamp, of a non-rotatable conductor rod incased within the spindle, a hollow guide post for the spindle and a cross head on the spindle guided in said post, electrical contact brushes carried by the cross head and in electrical contact with members in the post, and electrical connections between the brushes and conductor rod forming part of the electric circuit for the lamp.

11. In a sterilizing apparatus the combination with a rotatable spindle carrying a housing, of a revoluble crank arm carried by the housing and movable relative to the housing, and an ultraviolet lamp carried by said crank arm.

In testimony whereof I affix my signature.

LORENA M. WOOD.